United States Patent [19]
Byers et al.

[11] Patent Number: 5,257,382
[45] Date of Patent: Oct. 26, 1993

[54] DATA BANK PRIORITY SYSTEM

[75] Inventors: Larry L. Byers, Apple Valley; Wayne A. Michaelson, Circle Pines; Howard A. Koehler, Minneapolis, all of Minn.

[73] Assignee: Unisys Corporation, Blue Bell, Pa.

[21] Appl. No.: 667,790

[22] Filed: Mar. 11, 1991

Related U.S. Application Data

[62] Division of Ser. No. 246,509, Sep. 19, 1988, Pat. No. 5,032,984.

[51] Int. Cl.$^5$ ............................................. G06F 13/18
[52] U.S. Cl. ................................... 395/725; 395/425; 364/DIG. 1; 364/242.6; 364/242.7; 364/242.91
[58] Field of Search ................ 395/275, 325, 725, 425

[56] References Cited

U.S. PATENT DOCUMENTS

| | | | |
|---|---|---|---|
| 3,573,856 | 4/1971 | Best et al. | 364/200 |
| 3,603,935 | 9/1971 | Moore | 364/200 |
| 3,638,198 | 1/1972 | Balogh, Jr. | 364/200 |
| 3,643,218 | 2/1972 | Cramwinckel | 364/200 |
| 3,949,371 | 4/1976 | Pederzini | 395/275 |
| 4,009,470 | 2/1977 | Danilenko et al. | 364/200 |
| 4,059,851 | 11/1977 | Nutter, Jr. et al. | 395/275 |
| 4,232,294 | 11/1980 | Burke et al. | 395/725 |
| 4,314,335 | 2/1982 | Pezzi | 395/725 |
| 4,499,538 | 2/1985 | Finger et al. | 395/725 |
| 4,554,628 | 11/1985 | Bell | 395/725 |
| 4,675,812 | 6/1987 | Capowski et al. | 395/725 |
| 4,814,974 | 3/1989 | Narayanan et al. | 395/725 |
| 4,926,313 | 5/1990 | Byers et al. | 395/725 |
| 5,016,167 | 5/1991 | Nguyen et al. | 395/725 |
| 5,025,370 | 6/1991 | Koegel et al. | 395/725 |
| 5,032,984 | 7/1991 | Byers et al. | 395/725 |

*Primary Examiner*—Paul V. Kulik
*Attorney, Agent, or Firm*—Glenn W. Bowen; Mark T. Starr

[57] ABSTRACT

A system for apportioning serially supplied data among eight contending memory banks tends to equalize usage among the banks despite their arrangement in a predetermined, sequential priority. Each bank has a data hold egiter, or OR logic gate to generate a request signal whenever its register contains data, and a neative AND gate for enabling the bank for clearing data from its register. All except the lowest priority bank further include a blocking latch and an enabling NOR gate. Each blocking latch is set when its associated bank is enable, and then inhibits its associated AND gate and each higher priority AND gate, while enabling each lower priority NOR gate. Each enabled NOR gate provides an enabling signal to all lower priority AND gates. When the lowest priority AND gate is enabled by the NOR gates and its request signal, all blocking latches are cleared. The banks thus are utilized in a sequence that is maintained even if one or more banks are bypassed on occasion.

8 Claims, 4 Drawing Sheets

DATA BANK PRIORITY SYSTEM

This is a division of application Ser. No. 246,509, filed Sep. 19, 1988 U.S. Pat. No. 5,032,984 issued Jul. 16, 1991.

BACKGROUND OF THE INVENTION

This invention relates to systems for processing data, and more particularly to a means for apportioning data from common sources among a plurality of memory banks contending for the data.

It is a known technique in data processing to provide a configuration involving a plurality of memory banks or other destinations connected in common to one or more sources of data. Typically, incoming data is provided serially to a parallel arrangement of such destinations, whereby in combination they are capable of processing or transferring data at a rate commensurate with the serial data supply rate.

such systems require means for apportioning incoming data among the contending destinations. One approach involves assigning individual, sequential priority to the destinations. For example, U.S. Pat. No. 3,534,339 (Rosenblatt) discloses a system which encodes identification bits of multiple active devices simultaneously, and selects the identification bits corresponding to a request signal from the highest priority device. Similarly, in U.S. Pat. No. 3,425,037 (Patterson), signals from all peripheral devices sharing a common connection are monitored, with a request signal from each inhibited if the monitoring means senses a higher priority request. Other direct sequential priority systems are disclosed in U.S. Pat. No. 4,745,548 (Blahut) and U.S. Pat. No. 3,353,160 (Lindquist).

Alternatively, priority can be determined by sensing the priority of less than all contending destinations. For example, U.S. Pat. No. 3,832,692 (Henzel) discloses a plurality of priority seeking devices sharing a common bus. Each device "looks back" in the sense of determining the priority indications of two or more previous, higher priority devices. Thus, access is permitted only if the previous two or more devices are not requesting access.

The aforementioned sequential systems, when employed in connection with competing destinations, tend to supply the majority of data to the highest priority destinations at the expense of the lowest priority destinations. This problem can be reduced by limiting the number of separate destinations sharing the common source of data, or by employing additional circuitry or logic to counter the effect of the unequal priorities. For example, U.S. Pat. No. 3,676,860 (Collier) discloses a system in which competing processors each have a request phase and a control phase, with a priority system determining which among several processors can move from the request to the control phase. A register which determines priorities is modified each time a connection is established by one of the processors. In U.S. Pat. No. 3,399,384 (Crockett), each of a plurality of peripheral devices can issue demand signals of differing priorities. Consequently, final priority is determined by the level of the request, and also by a preassigned priority among the peripheral devices.

Another approach to countering the unequal priorities is shown in U.S. Pat. No. 4,760,515 (Malmquist). A plurality of arbiters are assigned a sequential priority, with each arbiter enabled to access a shared bus if no access requests are received from higher priority arbiters. A command rotor is provided to determine priority among plural requests simultaneously reaching the same arbiter. In U.S. Pat. No. 3,742,148 (Ledeen), sequentially arranged stations are connected to a common terminal, with each station having control circuitry interconnected with at least two other stations. In particular, control circuitry of a given station is connected to the next succeeding and to the next preceding stations. When conditioned to transmit, or when disabled by the next preceding station, the given station disables the succeeding station. The given station also can be disabled by the next succeeding station, in which case the control circuitry also disables the next preceding station.

To the extent that certain of these approaches tend to equalize the usage of the contending data destinations, they either tend to be overly complex, or fail to achieve a satisfactory degree of equality.

Therefore, it is an object of the present invention to improve the rate at which memory banks can be initiated for receiving serial data, while providing substantially equal usage of all banks.

Another object of the invention is to improve memory performance by issuing a bank request at the clock cycle rate, eliminating lost clock cycles between bank requests.

Another object is to inmate a bank function at a designated clock cycle rate, even if certain bank requests in a predetermined priority scheme are bypassed.

Yet another object is to increase the speed of operation of memory bank priority logic, by eliminating conventional scanning techniques which waste clock cycles on bank rotation regardless of the request status of the banks.

SUMMARY OF THE INVENTION

To achieve these and other objects, there is provided a data handling system including a plurality of memory banks. Each bank includes a data hold register for receiving the data, and means for generating a first request signal when its associated register is clear, and a second request signal when its associated register contains data. The banks contend for data from common sources in accordance with a predetermined priority scheme wherein each of the memory banks has a different priority. The system includes apparatus for apportioning the clearing of data from among all of the banks.

The apparatus includes a plurality of triggering means, each associated with one of the memory banks. Each triggering means, when enabled, enables clearing a data bit from the register of its associated bank. A plurality of control signal generating means are provided, one associated with each of the banks, for alternatively enabling and disabling its associated triggering means. Each of the control signal generating means includes a blocking means for providing a blocking signal responsive to the enabling of its associated triggering means, and further includes an enable signal generating means configured to receive the following signals as enabling inputs: the blocking signals of its associated bank and of all banks having a lower priority (equal and lower priority blocking signals) and its associated one of the first request signals. The enable signal generating means then generates an enable signal when receiving at least one of these signals.

The associated triggering means is configured to receive the following signals as trigger inputs: the equal and lower priority blocking signals; the enable signal from the enable signal generating means of all of the banks having a higher priority (higher priority enable signals); and the associated second request signal.

The associated triggering means is enabled, thereby to enable its associated memory bank for clearance of data from the associated hold register, responsive to receiving the higher priority enable signals and the associated second request signal while not receiving any of the equal and lower priority blocking signals.

Preferably, each of the aforementioned signals is present in the form of a selected one of alternative first and second states of a binary logic signal. The triggering means preferably includes a negative AND logic gate and an active latch receiving the output of the AND gate. A plurality of input channels to the AND gate are provided for receiving the high priority enable signals which are low, the equal and lower priority blocking signals which are high, and the request signal, which is high in the first state and low in the second state. The AND gate sets the active latch responsive to its receiving the higher priority enable signals and associated second request signal, while not receiving any of the equal and lower priority blocking signals, i.e. all inputs are low.

The blocking or indicator means can comprise a blocking latch, which receives the output of the associated active latch and thus becomes set whenever the active latch is set. A preferred enable signal generating means is a NOR logic gate, having input channels for receiving the equal and lower priority blocking signals and the first request signal. Each NOR gate provides its output to all of the AND logic gates of memory banks having a lower priority.

In spite of the predetermined priority among banks, the present system avoids over-utilizing higher priority banks. By virtue of the blocking signals provided to its AND logic gate, each bank is able to "look ahead" to receive an indication that the active and blocking latches of subsequent, lower priority banks are clear (not set), with higher priority, previously utilized banks prevented from accepting further data until their associated blocking latches are cleared. Accordingly, the banks collectively perform at a rapid rate as determined by the clock cycle, eliminating lost clock cycles between bank requests.

IN THE DRAWINGS

For a further appreciation of the above and other features and advantages, reference is made to the following detailed description and drawings, in which.

DETAILED DESCRIPTION OF THE PREFERRED EMBODIMENT

Figure 1:
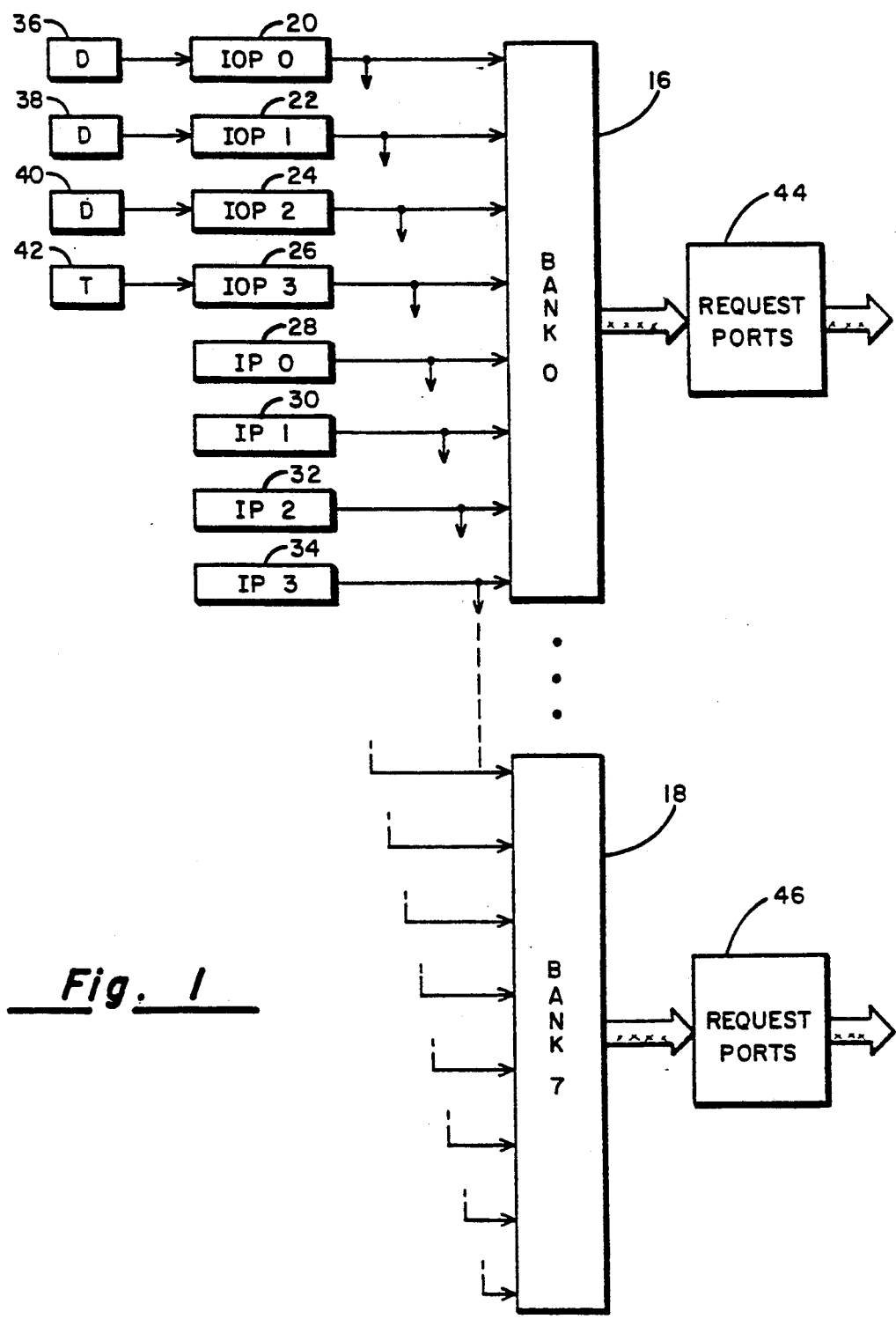
FIG. 1 is a schematic representation of a data handling system with a memory having a plurality of memory banks contending for data from common sources.

Turning now to the drawings, there is shown in FIG. 1 part of a data handling system including a central processing unit (CPU) or instruction processor having a plurality of memory banks including a bank designated "0" shown at 16, a memory bank designated "7" at 18. Similar intermediate banks are not shown, but all of the banks interact with one another. It is to be appreciated that a number of banks other than eight could be employed. Each memory bank receives data from a plurality of input/output processors 20-26 labeled IOP0, IOP1, IOP2 and IOP3, as well as from a plurality of other instruction processors 28-34 designated IP0, IP1, IP2 and IP3. Each of the input/output processors is connected with a peripheral storage device outside of the CPU. In particular, disc drives 36, 38 and 40 provide data to processors IOP0, IOP1 and IOP2, respectively. Processor 26 receives data from a tape drive 42. The additional instruction processors 28-34 are provided for executing commands or subroutines in the course of performing various operations on data from the tape drive or one of the disc drives.

Thus, it is seen that a portion of bank 16 (i.e. bank 0) must provide a common data bus or channel to receive the output of the instruction processors and transfer data to request ports at 44; and likewise, to ports 46 in connection with memory bank 18. The outputs for request ports 44 and 46 indicate a return path for data, either to one of the instruction processors 28-34 or through one of input/output processors 20-26 to its associated one of the disc drives or tape drives.

As indicated schematically by the downwardly pointing arrows in connection with processors 20-34, each of the processors can provide its output to any one of the memory banks. In this sense, these processors comprise common sources of data for the banks, and it is thus necessary to apportion, among all memory banks, incoming data from these sources.

Figure 2:
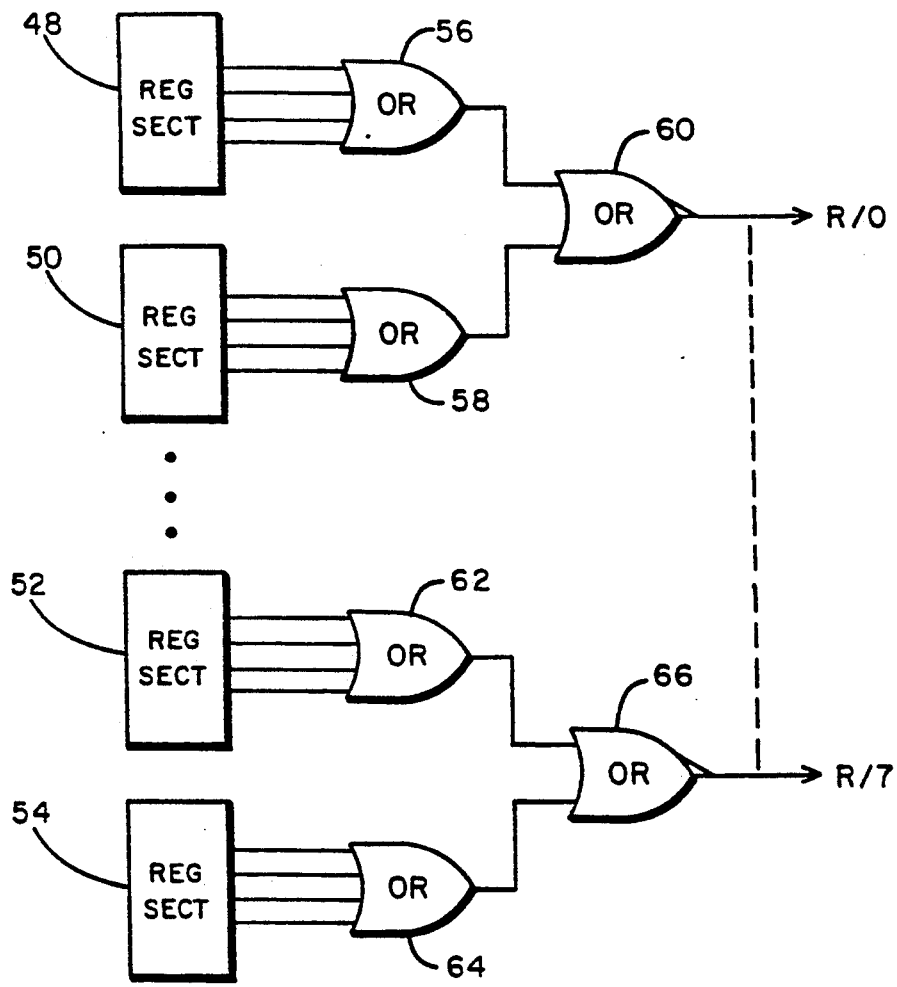
FIG. 2 is a more detailed schematic representation of data hold registers of the memory banks, along with means for indicating the presence of data in the registers.

As seen in FIG. 2, each of the banks includes a hold register dividing into first and second priority sectors, for example register sectors 48 and 50 in connection with bank 16 and register sectors 52 and 54 in connection with bank 18. First priority register sectors 48 and 52 process data from higher priority sources such as the input/output processors, while register sectors 50 and 54 handle lower priority data from the instruction processors 28-34. For further information on the means for accomplishing this priority scheme, reference is made to U.S. Pat. No. 4,926,313 (Byers et al).

Returning to FIG. 2, an OR gate 56 receives the output of each of four hold latches in register sector 48, and generates a high logic state as its output if any of these latches contains data. An OR gate 58 is similarly connected to the latches in register sector 50. The output of OR gates 56 and 58 is provided to an OR gate 60, the output of which is inverted to provide a request signal, here identified as R/o, corresponding to the highest priority bank.

In a similar manner, OR gates 62, 64 and 66 are associated with register sectors 52 and 54, thus to provide a signal designated R/7. Each request signal is low if any of its associated latches contains data, to provide an enabling signal for its associated bank to clear one of the latches in the hold register (provided that certain other enabling signals are also present). With its associated hold register cleared, however, the request signal goes high, to provide a signal for disabling its associated memory bank from receiving further data from the common sources.

Figure 3:
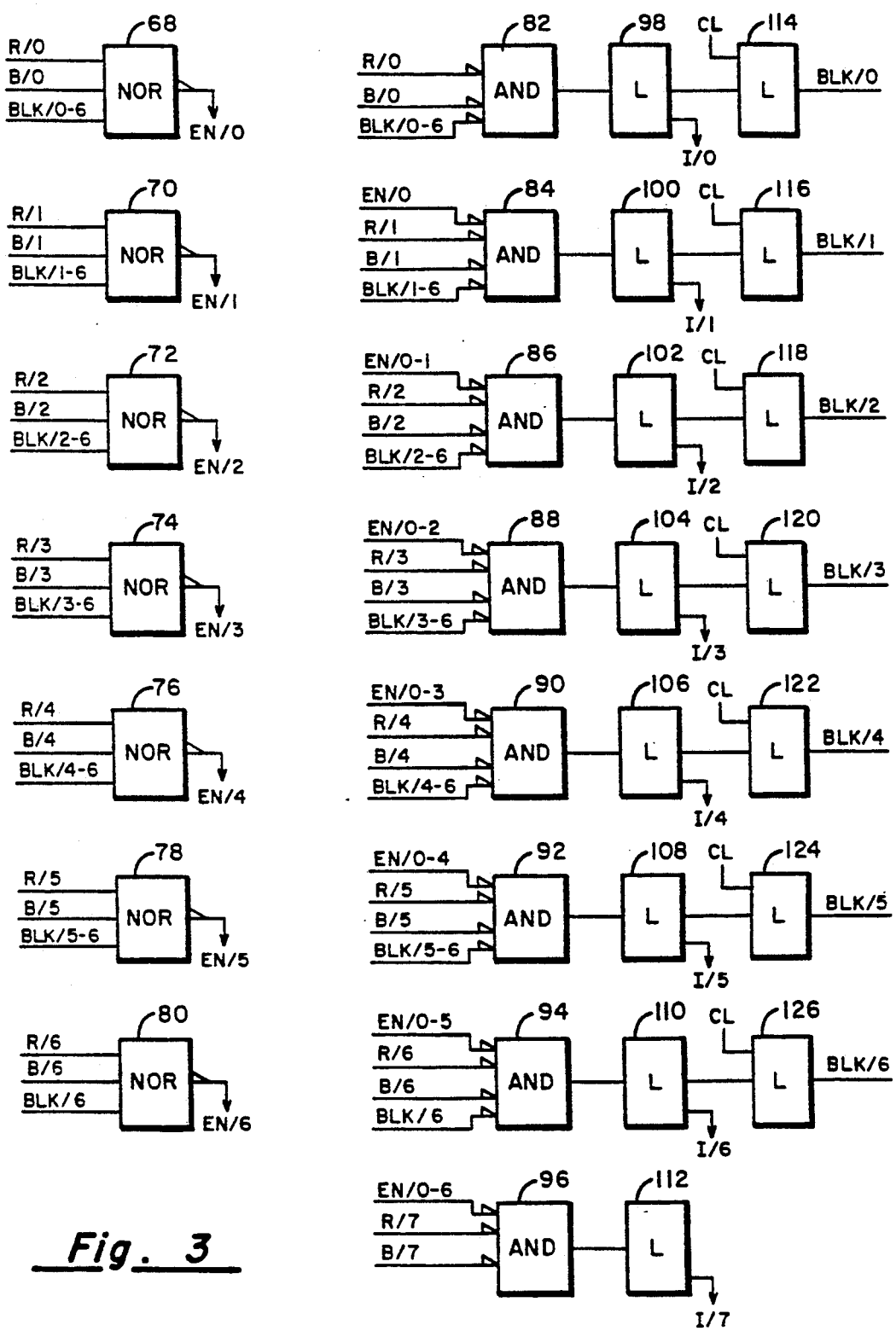
FIG. 3 is a schematic representation of a system for apportioning data among eight memory banks in accordance with the present invention.

FIG. 3 shows an interconnection among the eight memory banks which determines how incoming data is apportioned among the banks. Each of the banks includes a negative AND logic gate which provides its output to an active request latch. Bank 0 through bank 6, i.e. all except the lowest priority bank, further include an OR logic gate providing an input to the AND logic gate of all lower priority banks, and a blocking latch which receives the output of its associated active request latch. Thus, the apportioning system as a whole includes NOR gates 68-80, negative AND gates 82-96, active request latches 98-112 and blocking latches 114-126. Signals R/0 through R/7 are the request signals generated according to the hold register content, as noted in connection with FIG. 2. Each of signals B/0 through B/7 is an active signal generated responsive to the initiation of its associated bank to receive data, and has a sufficient duration, for example six clock pulses, to disable its associated bank from re-initiating a data request in an undesirably short time after a previous initiation.

Briefly, the components of the various banks are interconnected as follows. Each of NOR gates 68-80 receives three kinds of input: the signal R/n associated with its bank; input B/n associated with the bank; and the output of all of blocking latches 114-126 of equal or lower priority.

Each of AND gates 82-96 receives the following types of input: the associated request signal R/n; the associated active signal B/n; the output of each of blocking latches 114-126 having an equal or lower priority; and the output of each of NOR gates 68-80 having a higher priority.

Lowest priority memory bank 7 includes no NOR gate, and further includes no blocking latch. Rather, the setting of active latch 112 causes the latch to generate an I/7 clearing signal, which will clear all of the blocking latches of the memory banks.

Figure 4:
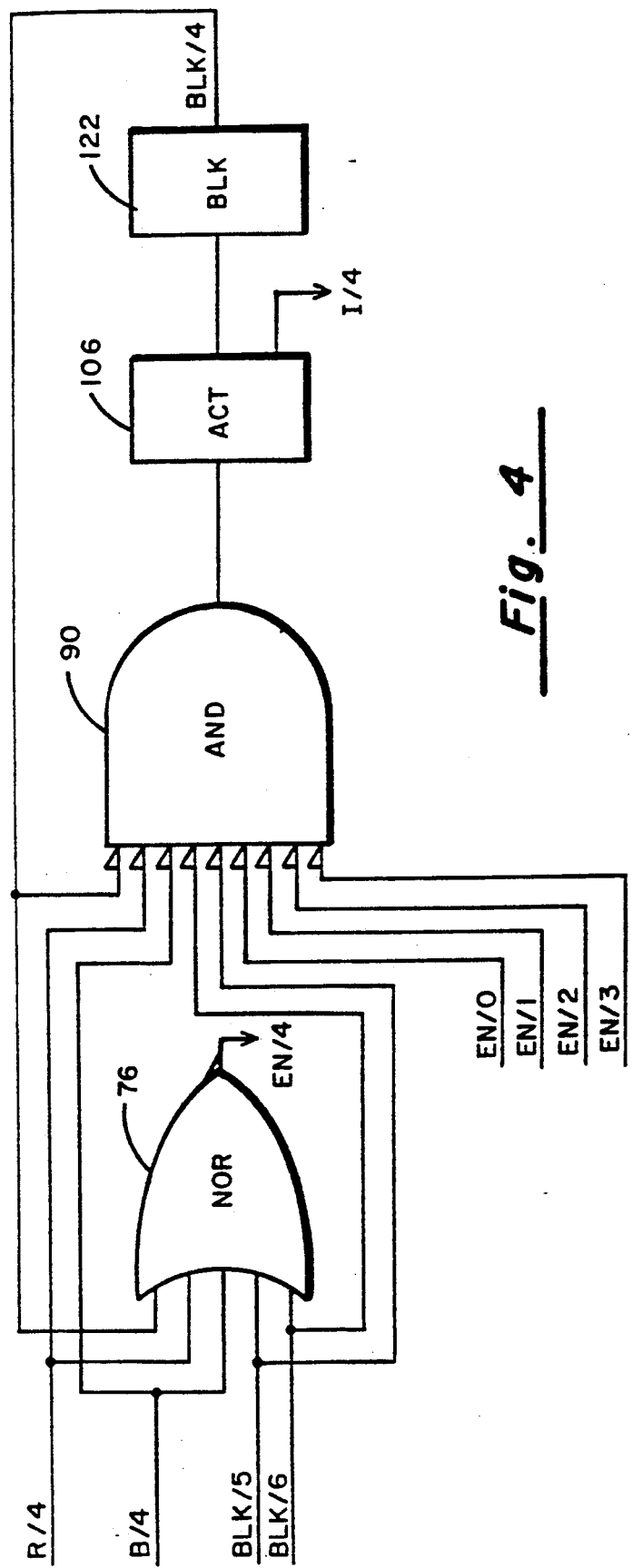
FIG. 4 is a more detailed representation of the initiation control means of one of the banks.

FIG. 4 illustrates the system in more detail, with reference to memory bank 4. The output of blocking latch 122 is provided to NOR gate 76, and provided to AND gate 90. Similarly, blocking latch output signals BLK/5 and BLK/6 are provided to NOR gate 76 and to AND gate 90. Enabling signals En/0 through En/3 from NOR gates 68-74 are provided to AND gate 90. Finally, request signal R/4 and active signal B/4 are provided to NOR gate 76 and to AND gate 90. When all signals provided to AND gate 90 are low, AND gate 90 sets active request latch 106, which sets blocking latch 122 and generates an "initiate" signal I. Signal I represents a request for data from the sources to the appropriate bank, in this case bank 4, and is used in the divided latch priority system discussed in the aforementioned U.S. Pat. No. 4,926,313.

Figure 5:
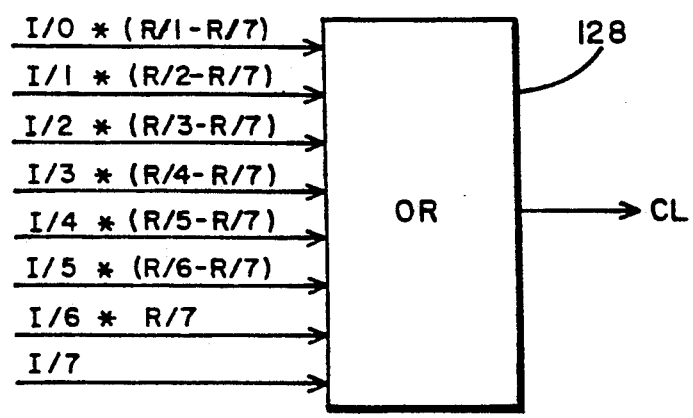
FIG. 5 schematically illustrates a means for re-initiating a cycle through the memory banks upon initiation of the lowest priority memory bank.

FIG. 5 discloses the means for clearing blocking latches 114-126 in greater detail. In FIG. 5, the symbol I/0*(R1-R7) signifies the logical AND of I/O with the logical OR of R/1 through R7. The symbols on the remaining input lines to OR gate 128 have a similar meaning. An OR gate 128 provides the clearing signal to the blocking latches in accordance with any of eight conditions. One of these conditions, namely that the output of active request latch 112 is high, is shown in FIG. 3. The remaining inputs to OR gate 128 relate to each of remaining active request latches, in particular inputs that satisfy the condition that a given active request latch is set, and all of the lower priority hold register latches are cleared.

The system operates as follows, beginning with the condition of all of blocking latches 114-126 being clear, and the hold registers of all of the memory banks clear for receiving data. Request signals R/0 through R/7 are high, and active signals B/0 through B/7 are in the low logic state. Also low are signals BLK/0 through BLK/6, the outputs of the blocking latches. Pursuant to the aforementioned priority scheme, processor requests are issued to various banks. Assume that a request issues to each of the banks, so that the hold registers of all banks now contain data. Request signals R/0 through R/7 go low. Consequently, AND gate 82 is conditioned to set active request latch 98, whereupon latch 98 generates the bank initiation signal I/0 and sets blocking latch 114. Blocking signal BLK/0 thus becomes high, enabling NOR gate 68 and inhibiting AND gate 82. The active signal B/0 is shifted to the high logic level, and the highest priority latch of register sectors 48 and 50 of memory bank 16 is cleared. Further data is not cleared from bank 16 (bank 0) at this point, as AND gate 82 remains disabled.

Bank 1, however, becomes conditioned for initiation and clearing priority, because the shift of any one of R/0, B/0 or BLK/0 to the high level is sufficient to enable NOR gate 68, thus providing the NOR gate output signal En/0 at a low logic level to AND gate 84. Due to the presence of data in bank 1, signal R/1 is low, and signal B/1 is low. The outputs of blocking latch 116 and all lower priority blocking latches, i.e. blocking latches 118-126, ar, low, since these latches remain clear. All of these inputs are provided to AND gate 84, and thus condition this AND gate to set active request latch 100. Latch 100 then generates initiation signal I/1 and sets blocking latch 116. As soon as this blocking latch is set, NOR gate 70 is enabled and AND gate 84 is inhibited, which for the moment prevents bank 1 from being cleared of further data.

Assuming all of the remaining banks have data, the sequence of operation will proceed as described, until AND gate 96 of bank 7 is enabled, thereby to set active request latch 112, to generate the initiation signal I/7 and the clearing signal which clears all of the blocking latches, thus to condition all banks for clearance of further data.

Should one of the memory banks in the sequence not be conditioned for clearing of data, such bank can be bypassed and the sequence continues as described. For example, suppose in the above sequence that bank 2 does not have data in its hold register and causes a resultant signal R/2 at the high logic level. This of course inhibits AND gate 86 from setting active request latch 102, and consequently blocking latch 118 is not set. Further, the fact that blocking latches 114 and 116 remain set continues to inhibit higher priority AND gates 82 and 84.

In this case, the system "looks ahead" to lower priority AND gates 88 through 96. Assuming the hold register of bank 3 contains data, signals R/3 and B/3 are low. Blocking latches 120 through 126 remain clear. Further, as signal R/2 is high, the output of NOR gate 72 (signal En/2) is low. These signals are supplied to AND gate 88, and all are low, so that AND gate 88 is conditioned to set its associated request pending latch.

Likewise, it is to be appreciated that the logic permits bypassing of two or more consecutive memory banks.

In particular, assuming memory banks 2 and 3 had been bypassed due to the absence of data in their hold registers, signals R/2 and R/3 would both be at the high logic level, permitting NOR gates 72 and 74 to provide the necessary input to enable AND gate 90 of bank 4.

Thus, in spite of the predetermined sequential priority from bank 0 through bank 7, the system in accordance with the present invention results in substantially equal usage among these memory banks. One or more banks in the predetermined sequence can be bypassed without wasting clock cycles, due to the virtually instantaneous conditioning of the next lower priority bank following the bypassed banks. Thus, performance of the memory is improved by virtue of increased speed and equal usage among individual memory banks.

What is claimed is:

1. In a priority access system formed of a combination of elements comprising,
    (a) at least one access requesting means,
    (b) a plurality of n accessible means which are to be accessed by said access requesting means in a fixed priority sequence during successive access periods during each of which access periods m of said accessible means may be accessed by said access requesting means, where n is a positive integer that may vary from access period to access period, and during any given access period may have a value from 1 to n,
    (c) clock means constructed to supply clock pulses in a repetitive clock pulse train, and
    (d) access means coupled to said access requesting means, to all of said accessible means and to said clock means constructed to provide access for said access requesting means to each of said accessible means to which said access requesting means has requested access during each of said access period in order of said priority sequence, and such that access to each one of said accessible means is accomplished upon each occurrence of a different one of said clock pulses of said repetitive clock pulse train during said access period,
    the improvement wherein said access means comprises digital electronic circuit means for providing access to said accessible means such that when access to m of said accessible means has been granted by said access requesting means for any given access period, then only m consecutive clock pulses of said clock pulse train will have been utilized by said access means to provide said requested accesses for said m accessible means regardless of the value of n.

2. A priority access system as claimed in claim 1 wherein said accessible means comprises memory banks and said access requesting means comprises memory bank requesting means which are coupled to said memory banks.

3. A priority access means as claimed in claim 1 wherein said access means is coupled to receive digital codes representative of said requested accesses during each of said access periods from said access requesting means and is coupled to transmit digital priority control signals to said accessible means to implement said priority access system wherein said digital electronic circuit means comprises digital logic means for providing digital signals that are representative of said digital codes, and digital activating circuit means coupled to said digital logic means for receiving said digital signals and coupled to said accessible means for supplying said digital priority control signals to said accessible means during each of said access periods.

4. A priority access system as claimed in claim 3 wherein said accessible means comprises memory banks and said access requesting means comprises memory bank requesting means which are coupled to said memory banks.

5. A priority access system as claimed in claim 3 wherein said digital activating circuit means comprises activating latch means coupled to said digital logic means for receiving said digital signals and coupled to said accessible means for activating said accessible means and blocking latch means coupled to said activating latch means and coupled to said accessible means for blocking access to said accessible means, wherein said activating latch means and said blocking latch means cooperate to establish the priority sequence that is represented by said digital codes for each of said access periods.

6. A priority access system as claimed in claim 5 wherein said accessible means comprises memory banks and said access requesting means comprises memory bank requesting means which are coupled to said memory banks.

7. A priority access system as claimed in claim 5 comprising digital reinitialization means coupled to said blocking latch means for reinitializing said access means for the receipt and utilization of new digital codes for each new access period upon the completion of each prior access period.

8. A priority access system as claimed in claim 7 wherein said accessible means comprises memory banks and said access requesting means comprises memory bank requesting means which are coupled to said memory banks.

* * * * *